US010801890B1

(12) United States Patent
Fu et al.

(10) Patent No.: US 10,801,890 B1
(45) Date of Patent: Oct. 13, 2020

(54) MEASUREMENT SYSTEM AND A METHOD OF DIFFRACTING LIGHT

(71) Applicant: Applied Materials, Inc., Santa Clara, CA (US)

(72) Inventors: Jinxin Fu, Fremont, CA (US); Yifei Wang, Sunnyvale, CA (US); Ian Matthew McMackin, Mountain View, CA (US); Rutger Meyer Timmerman Thijssen, San Jose, CA (US); Ludovic Godet, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 16/539,930

(22) Filed: Aug. 13, 2019

Related U.S. Application Data (60) Provisional application No. 62/780,792, filed on Dec. 17, 2018, provisional application No. 62/834,219, filed on Apr. 15, 2019.

(51) Int. Cl.
   *G01J 3/30* (2006.01)
   *G01J 3/18* (2006.01)
   (Continued)

(52) U.S. Cl.
   CPC . *G01J 3/18* (2013.01); *G01J 3/02* (2013.01); *G02B 7/04* (2013.01); *G01J 2003/423* (2013.01)

(58) Field of Classification Search
   CPC .......... G01J 3/18; G01J 3/02; G01J 2003/423; G01J 3/10; G01J 3/28; G01J 3/26; G02B 7/04
   See application file for complete search history.

(56) References Cited

U.S. PATENT DOCUMENTS 6,577,786 B1   6/2003   Cappiello et al.
6,762,881 B2   7/2004   Kleemann et al.
(Continued)

FOREIGN PATENT DOCUMENTS

CN   108303038 A   7/2018

OTHER PUBLICATIONS

International Search Report/Written Opinion issued to PCT/US2020/026829 dated Aug. 4, 2020.

*Primary Examiner* — Abdullahi Nur
(74) *Attorney, Agent, or Firm* — Patterson + Sheridan LLP (57) ABSTRACT

Embodiments of the present disclosure relate to measurement systems and methods for diffracting light. The measurement system includes a stage, an optical arm, and one or more detector arms. The method of diffracting light includes a method of diffracting light is provided, including projecting light beams having wavelength $\lambda_{laser}$ to a first zone of a first substrate at the fixed beam angle $\theta_0$ and the maximum orientation angle $\phi_{max}$, obtaining a displacement angle $\Delta\theta$, determining a target maximum beam angle $\theta_{t\text{-}max}$, wherein $\theta_{t\text{-}max} = \theta_0 + \Delta\theta$, and determining a test grating pitch $P_{t\text{-}grating}$ by a modified grating pitch equation $P_{t\text{-}grating} = \lambda_{laser}/(\sin\theta_{t\text{-}max} + \sin\theta_0)$. The measurement system and method allow for measurement of nonuniform properties of regions of an optical device, such as grating pitches and grating orientations.

20 Claims, 10 Drawing Sheets

(51) Int. Cl.
  *G02B 7/04* (2006.01)
  *G01J 3/02* (2006.01)
  *G01J 3/42* (2006.01)

(56) References Cited

U.S. PATENT DOCUMENTS

2001/0046087 A1    11/2001  Hoose
2004/0012775 A1     1/2004  Kinney et al.
2017/0176348 A1     6/2017  Leem et al.
2017/0350689 A1    12/2017  Matsushita et al.
2019/0153520 A1*    5/2019  Barbee .............. B01L 3/502715

* cited by examiner

MEASUREMENT SYSTEM AND A METHOD OF DIFFRACTING LIGHT

CROSS-REFERENCE TO RELATED APPLICATIONS

This application claims priority to U.S. Provisional Patent Application No. 62/834,219, dated Apr. 15, 2019, which is hereby incorporated by reference in its entirety.

BACKGROUND

Field

Embodiments of the present disclosure relate an apparatus and a method and, more specifically, to a measurement system and a method of diffracting light.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. In order to achieve an augmented reality experience, a virtual image is overlaid on an ambient environment, with the overlaying performed by optical devices.

One drawback in the art is that fabricated optical devices tend to have nonuniform properties, such as grating pitches and grating orientations. In addition, as-deposited optical devices can inherit nonuniformities of their substrate, such as local warping or deformations of the substrate. Also, if deposition occurs on a substrate disposed on an uneven supporting surface, such as imperfections or particles present on the supporting surface, the substrate can be tilted and the deposited optical device can inherit these distortions as well.

Therefore, what are needed in the art are apparatuses and methods to detect nonuniformity in optical devices.

SUMMARY

In one embodiment, a measurement system is provided, including a stage, an optical arm coupled to an arm actuator configured to scan the optical arm and rotate the optical arm about an axis, and a detector arm. The stage has a substrate support surface. The stage is coupled to a stage actuator configured to move the stage in a scanning path and rotate the stage about the axis. The optical arm includes a laser positioned adjacent to a beam splitter positioned in a light path adjacent to an optical detector, the laser operable to project light beams to the beam splitter that are deflected at a beam angle θ along the light path to the stage. The detector arm includes a detector actuator configured to scan the detector arm and rotate the detector arm about the axis, a first focusing lens, and a detector.

In another embodiment, a measurement system is provided, including a stage, an optical arm coupled to an arm actuator configured to scan the optical arm and rotate the optical arm about an axis, a primary detector arm, and a secondary detector arm. The stage has a substrate support surface. The stage is coupled to a stage actuator configured to move the stage in a scanning path and rotate the stage about the axis. The optical arm includes a laser positioned adjacent to a beam splitter positioned in a light path adjacent to an optical detector, the laser operable to project light beams to the beam splitter that are deflected at a beam angle θ along the light path to the stage. Each of the detector arms include a detector actuator configured to scan the detector arm, a first focusing lens, and a detector.

In yet another embodiment, a method of diffracting light is provided, including projecting light beams having wavelength $\lambda_{laser}$ to a first zone of a first substrate at a fixed beam angle $\theta_0$ and a maximum orientation angle $\phi_{max}$, obtaining a displacement angle $\Delta\theta$, determining a target maximum beam angle $\theta_{t-max}$, wherein $\theta_{t-max} = \theta_0 + \Delta\theta$, and determining a test grating pitch $P_{t-grating}$ by a modified grating pitch equation $P_{t-grating} = \lambda_{laser}/(\sin \theta_{t-max} + \sin \theta_0)$.

The measurement system and method of measurement measures local nonuniformities of regions of the optical device, such as grating pitches and grating orientations. The local nonuniformity values are useful to assess the performance of the optical device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to measurement systems and methods for measuring local nonuniformities of optical devices. The measurement system includes a stage, an optical arm, and one or more detector arms including one or more focusing lenses. Light projected from the optical arm reflects from a substrate disposed on the stage, and the reflected light from the substrate surface is incident on the detector. The deflection from the optical center of the focusing lens is used to determine the local nonuniformity of the optical device. Methods of diffracting light include measuring scattered light beams from the substrate surface, and local distortions are obtained from the measured values. Embodiments disclosed herein may be especially useful for, but not limited to, measuring local uniformities in optical systems.

As used herein, the term "about" refers to a +/−10% variation from the nominal value. It is to be understood that such a variation can be included in any value provided herein.

Figure 1A:
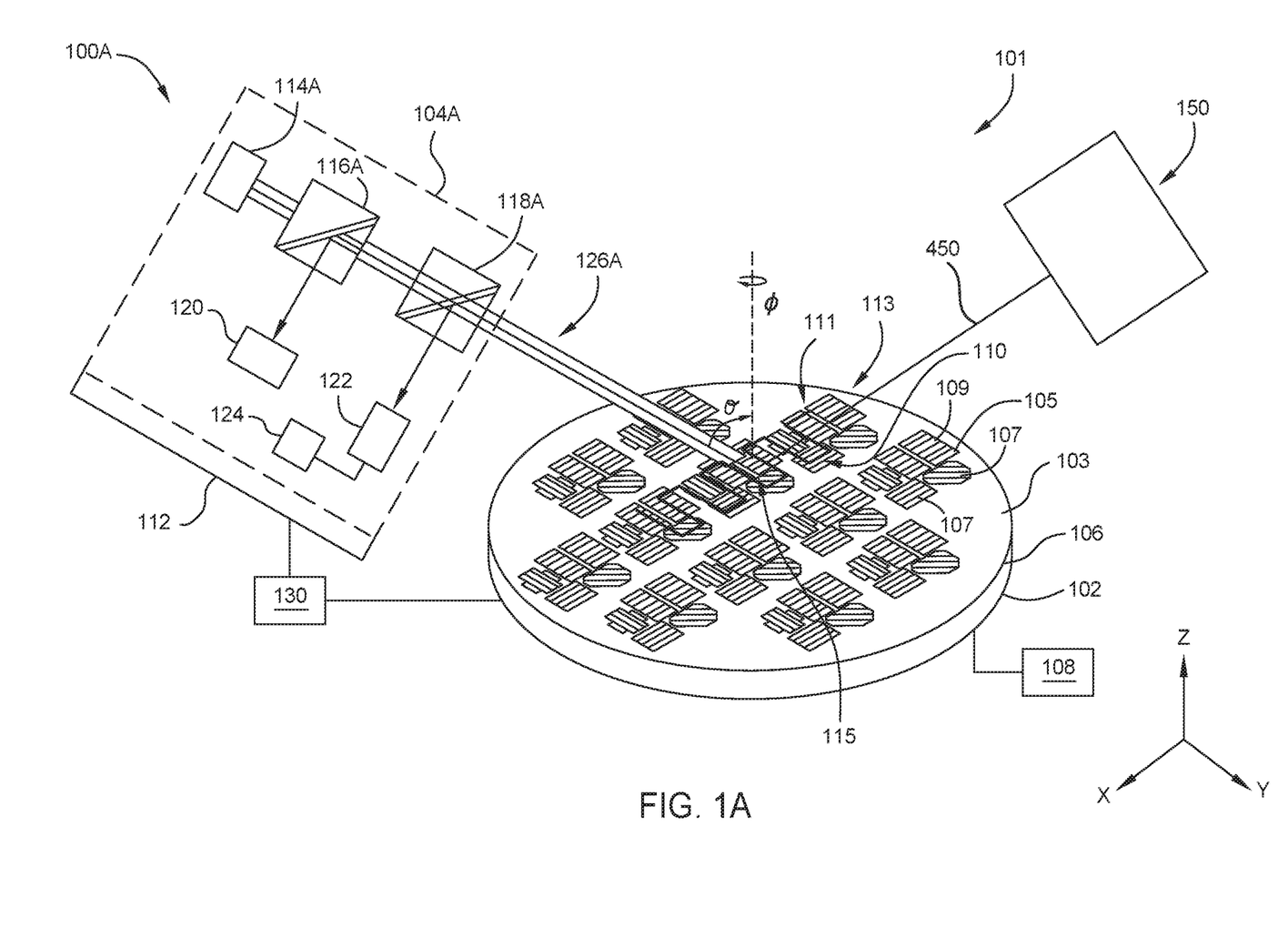
FIGS. 1A-1C illustrate schematic views of configurations of a measurement system, according to some embodiments.

FIG. 1A illustrates a schematic view of a first configuration 100A of a measurement system 101, according to one embodiment. As shown, the measurement system 101 includes a stage 102, an optical arm 104A, and one or more detector arms 150. The measurement system 101 is configured to diffract light created by the optical arm 104. The light created by the optical arm 104 is directed at a substrate disposed over the stage 102, and the diffracted light is incident on the one or more detector arms 150.

As shown, the stage 102 includes a support surface 106 and a stage actuator 108. The stage 102 is configured to retain a substrate 103 on the support surface 106. The stage 102 is coupled to the stage actuator 108. The stage actuator 108 is configured to move the stage 102 in a scanning path 110 along an x-direction and a y-direction, and rotate the stage 102 about a z-axis. The stage 102 is configured to move and rotate the substrate 103 so that light from the optical arm 104A is incident on different portions or regions of the substrate 103 during operation of the measurement system 101.

Figure 3:
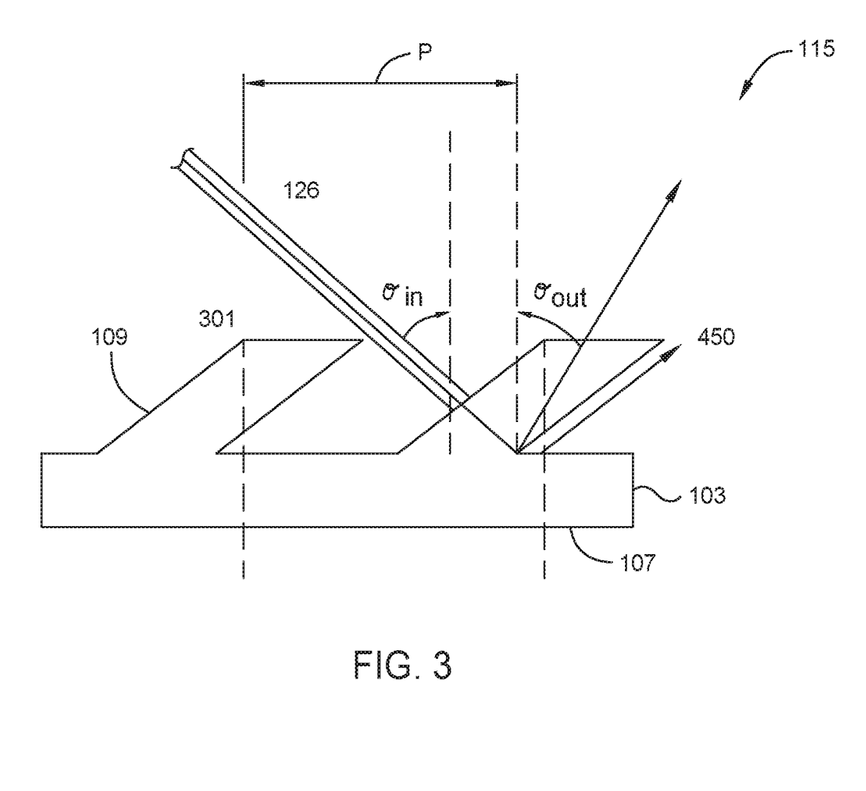
FIG. 3 illustrates a schematic cross-sectional view of a first zone, according to one embodiment.

The substrate 103 includes one or more optical devices 105 having one or more regions 107 of gratings 109. Each of the regions 107 have gratings 109 with an orientation angle $\phi$ and a pitch P (FIG. 3), and P is defined as a distance between adjacent points, such as adjacent first edges 301 or adjacent center of masses of the gratings 109. The pitch P and the orientation angle $\phi$ of the gratings 109 for a first region 111 can be different than the pitch P and the orientation angle $\phi$ of the gratings 109 for a second region 113 of the one or more regions 107. In addition, there can be local pitch P' variations and local orientation angle $\phi'$ variations due to local warping or other deformation of the substrate 103. The measurement system 101 can be utilized to measure the pitch P and the orientation angle $\phi$ of the gratings 109 for each of the regions 107 of each of the optical devices 105. The substrate 103 can be a single crystal wafer of any size, such as having a radius from about 150 mm to about 450 mm. As shown, the light beam 126A from the optical arm 104A is scattered from the region 107 into the initial $R_0$ beam 450, which is described in more detail below.

The optical arm 104, the detector arm 150, and the stage 102 are coupled to a controller 130. The controller 130 facilitates the control and automation of the method for measuring the pitch P and the orientation angle $\phi$ of gratings 109 described herein. The controller may include a central processing unit (CPU) (not shown), memory (not shown), and support circuits (or I/O) (not shown). The CPU may be one of any form of computer processors that are used in industrial settings for controlling various processes and hardware (e.g., motors and other hardware) and monitor the processes (e.g., transfer device position and scan time). The memory (not shown) is connected to the CPU, and may be a readily available memory, such as random access memory (RAM). Software instructions and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like. A program (or computer instructions) readable by the controller determines which tasks are performable on the substrate 103. The program may be software readable by the controller and may include code to monitor and control, for example, substrate position and optical arm position.

As shown, the optical arm 104A includes a white light source 114A, a first beam splitter 116A, a second beam splitter 118A, a laser 120, detector 122, and a spectrometer 124. The white light source 114 can be a fiber coupled light source. The first beam splitter 116A is positioned in a light path 126A adjacent to the white light source 114. The white light source 114 is operable to project white light at a beam angle $\theta$ along the light path 126A to the substrate 103, according to one embodiment. The laser 120 can be a fiber coupled light source. The laser 120 is positioned adjacent to the first beam splitter 116A. The laser 120 is operable to project light beams having a wavelength to the first beam splitter 116A such that the light beams are deflected at the beam angle $\theta$ along the light path 126A to the substrate 103. The second beam splitter 118A is positioned in the light path 126A adjacent to the first beam splitter 116A. The second beam splitter 118A is operable to deflect light beams reflected by the substrate 103 to the detector 122. The spectrometer 124 is coupled to the detector 122 to determine the wavelength of the light beams deflected to the detector 122. The light beams described herein can be laser beams. The optical arm 104 delivers a light beam along the light path 126 so that the light can be deflected by the substrate 103 and measured by the one or more detector arms 150.

Figure 1B:
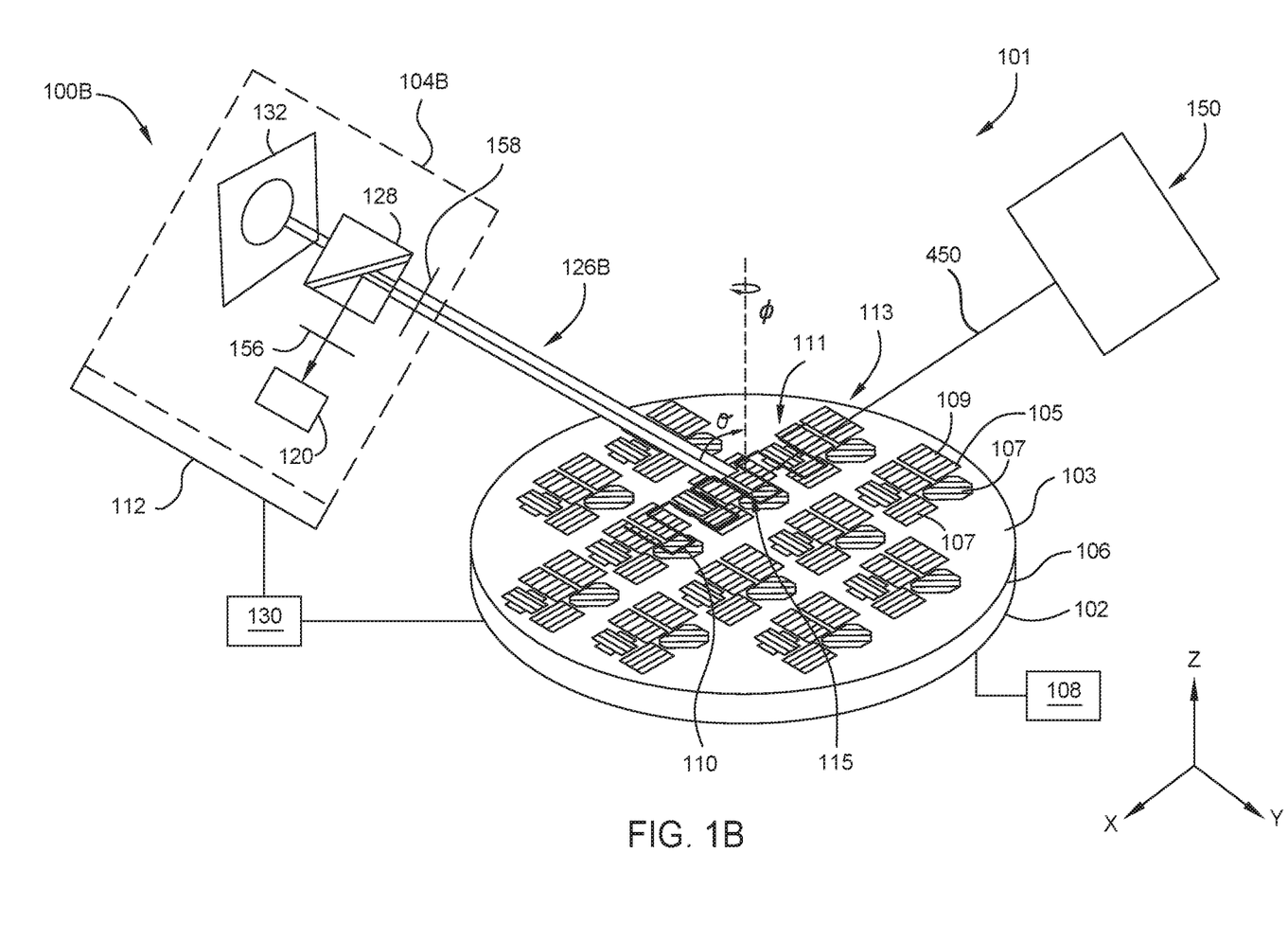

FIG. 1B illustrates a schematic view of a second configuration 100B of the measurement system 101, according to one embodiment. As shown, the optical arm 104B includes the laser 120, a beam splitter 128, and a beam position detector 132. The beam position detector 132 can include an image sensor, such as a CCD or CMOS sensor. The beam splitter 128 is positioned in a light path 126B adjacent to the beam position detector 132. The laser 120 is positioned adjacent to the beam splitter 128. The laser 120 is operable to project light beams having a wavelength to the beam splitter 128 such that the light beams are deflected at the beam angle $\theta$ along the light path 126B to the substrate 103. The optical arm 104B includes a polarizer 156, such as a half waveplate, and a quarter waveplate 158, according to one embodiment. The polarizer 156 is between the laser 120 and the beam splitter 128. The polarizer 156 maximizes the efficiency of the light beams deflected by the beam splitter 128 at the beam angle $\theta$. The quarter waveplate 158 is in the light path 126B and is positioned adjacent to the beam splitter 128. The quarter waveplate 158 maximizes the efficiency of light beams reflected by the substrate 103 to the beam position detector 132, and reduces the light beams reflected to the laser 120.

Figure 1C:
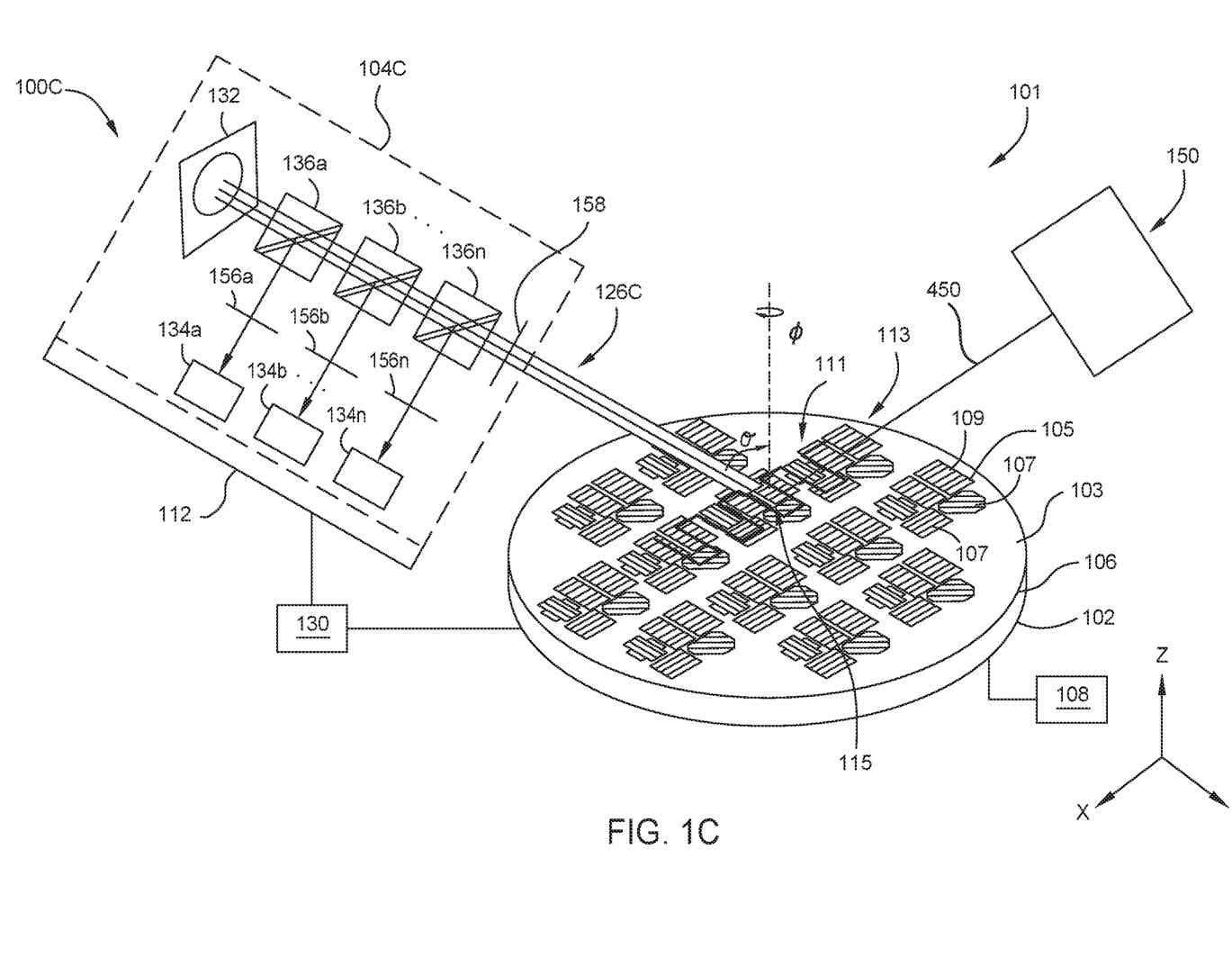

FIG. 1C illustrates a schematic view of a third configuration 100C of the measurement system 101, according to one embodiment. The optical arm 104C includes lasers 134a, 134b, . . . 134n (collectively referred to as the "plurality of lasers 134"), and beam splitters 136a, 136b, . . . 136n (collectively referred to as the "plurality of beam splitters 136"). The plurality of beam splitters 136 are positioned adjacent to each other in a light path 126C adjacent to the beam position detector 132. The laser 134a is configured to project light beams having a first wavelength to the beam splitter 136a such that the light beams of the first wavelength are deflected at the beam angle θ along the light path 126C to the substrate 103. The laser 134b is configured to project light beams having a second wavelength to the beam splitter 136b such that the light beams of the second wavelength are deflected at the beam angle θ along the light path 126C to the substrate 103. The laser 134n is configured to project light beams having a third wavelength to the beam splitter 136n such that the light beams of the third wavelength are deflected at the beam angle θ along the light path 126C to the substrate 103.

The optical arm 104C can include polarizers 156a, 156b, . . . 156n (collectively referred to as the "plurality of polarizers 156C") and a quarter waveplate 158. The plurality of polarizers 156C is between the plurality of lasers 134 and the plurality of beam splitters 136. The plurality of polarizers 156C maximizes the efficiency of the light beams deflected by the plurality of beam splitters 136 at the beam angle θ. The quarter waveplate 158 is in the light path 126C and is positioned adjacent to the beam splitter 136n. The quarter waveplate 158 maximizes the efficiency of light beams reflected by the substrate 103 to the beam position detector 132. The quarter waveplate 158 is interchangeable for desired wavelengths.

In any of the above configurations 100A, 100B, 100C, the optical arm 104A, 104B, 104C can include an arm actuator 112, and the arm actuator is configured to rotate the optical arm 104 about the z-axis and scan the optical arm in a z-direction. The optical arm 104 can be fixed while the measurement is performed.

Figure 2A:
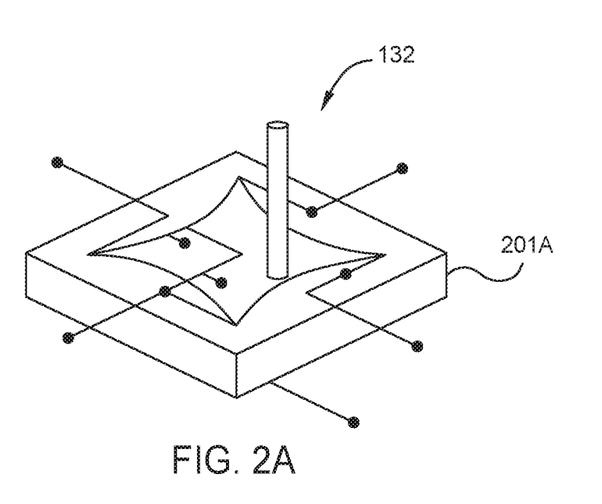
FIGS. 2A-2C illustrate schematic views of a beam position detector, according to some embodiments.
Figure 2B:
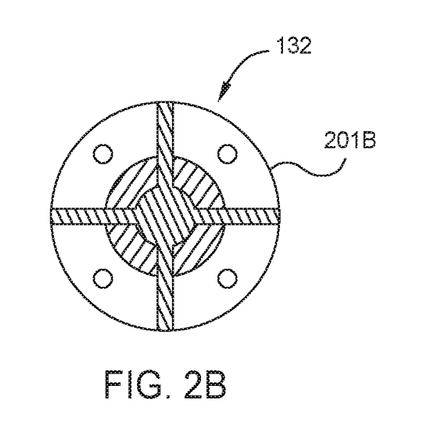
Figure 2C:
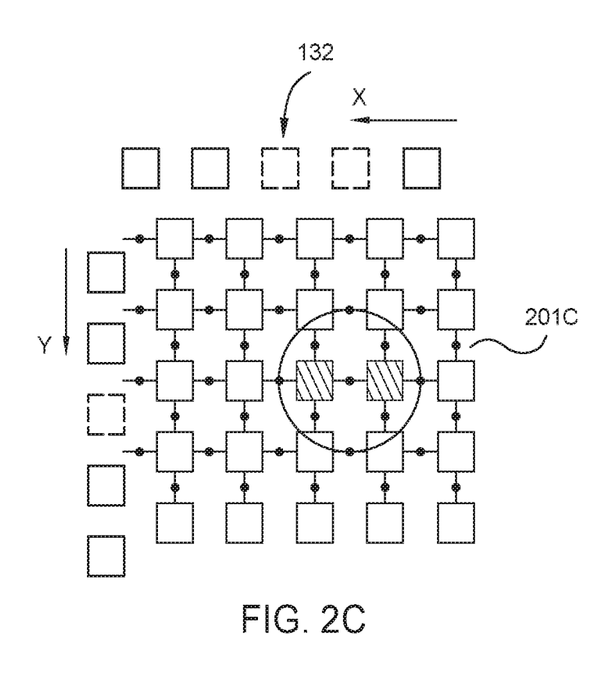

The beam position detector 132, of the second configuration 100B and the third configuration 100C, is operable to determine beam positions of the light beams reflected by the substrate 103 to the beam position detector 132. FIG. 2A illustrates the beam position detector 132 as a position sensitive detector 201A, i.e., a lateral sensor, according to one embodiment. FIG. 2B illustrates the beam position detector 132 as a quadrant sensor 201B, according to one embodiment. FIG. 2C illustrates the beam position detector 132 as an image sensor array 201C, such as a charge-coupled device (CCD) array or a complementary metal-oxide-semiconductor (CMOS) array, according to some embodiments.

Figure 4A:
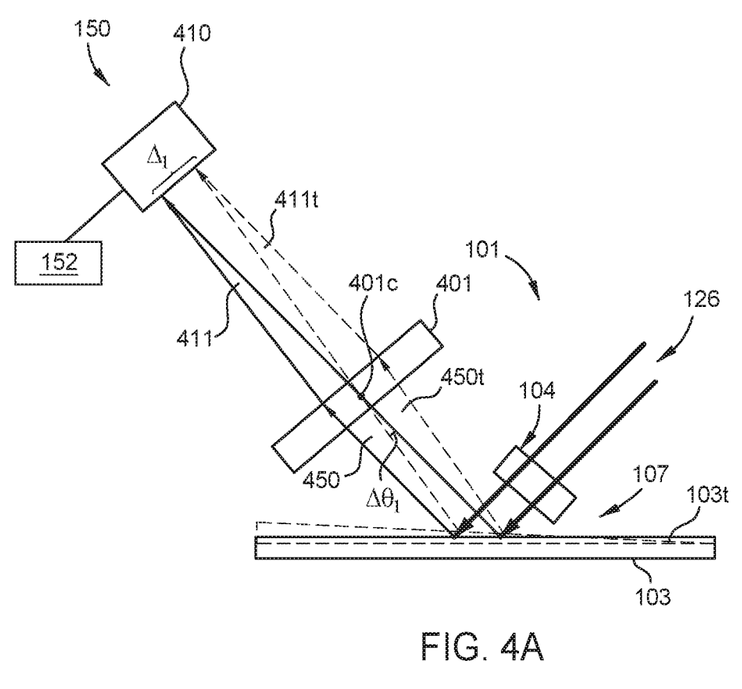
FIGS. 4A-4D illustrate schematic views of measurement systems including one or more detector arms, according to some embodiments.

FIG. 4A illustrates a schematic view of the detector arm 150, according to one embodiment. As shown, the detector arm 150 includes a detector 410, a detector arm actuator 152, and a first focusing lens 401. The detector arm actuator 152 is configured to rotate the detector arm 150 about the z-axis and scan the detector arm 150 in a z-direction. In FIGS. 4A-4D, the light from the light path 126 reflects from the region 107 of the substrate 103. The light is reflected into an initial $R_0$ beam 450, which is focused by the first focusing lens 401 into the first $R_0$ beam 411. The first $R_0$ beam 411 is incident on the detector 410. The detector 410 is any optical apparatus used in the art to detect light, such as a CCD array or a CMOS array.

Before the measurement of the region 107, the measurement system 101 can be calibrated with a known substrate 103, and the detector arm 150 can be positioned such that the first $R_0$ beam 411 is incident on the optical center 401c of the first focusing lens 401. Any of the measurement systems 101 described above and below can be calibrated with a known substrate 103, as described herein. Due to local distortions in the region 107, the initial $R_0$ beam 450 for the reference region 107 is no longer incident on the optical center 401c of the focusing lens 401. For example, there can be local warping of the substrate 103 at the region 107, or global wafer tilt, wedge, warp, or bow. The substrate 103 can be tilted on the support surface 106 due to the presence of particles on the support surface, and the particles disposed between the substrate 103 and the support surface cause local and/or global distortions, such as raised region 107 height or an incline of the region to the support surface (shown as a tilted substrate 103t in FIGS. 4A-4D). In these cases with the tilted substrate 103t, the initial $R_0$ beam 450t is incident on the first focusing lens 401 at a first angle $\Delta\theta_1$, and the first $R_0$ beam 411t is focused to a portion of the detector 410 that is about the first delta distance $\Delta_1$ away from the focused first $R_0$ beam 411 of the known substrate 103, according to one embodiment. The first delta distance $\Delta_1$ is given by $\Delta_1=f_1*\tan(\Delta\theta_1)$, where $f_1$ is the focal length of the focusing lens 401. Thus, the first delta distance $\Delta_1$ and the first angle $\Delta\theta_1$ can be used to obtain local distortion information, as is described in further detail below. The resolution of the detector 410 is less than about $\Delta_1$, according to one embodiment.

Figure 4B:
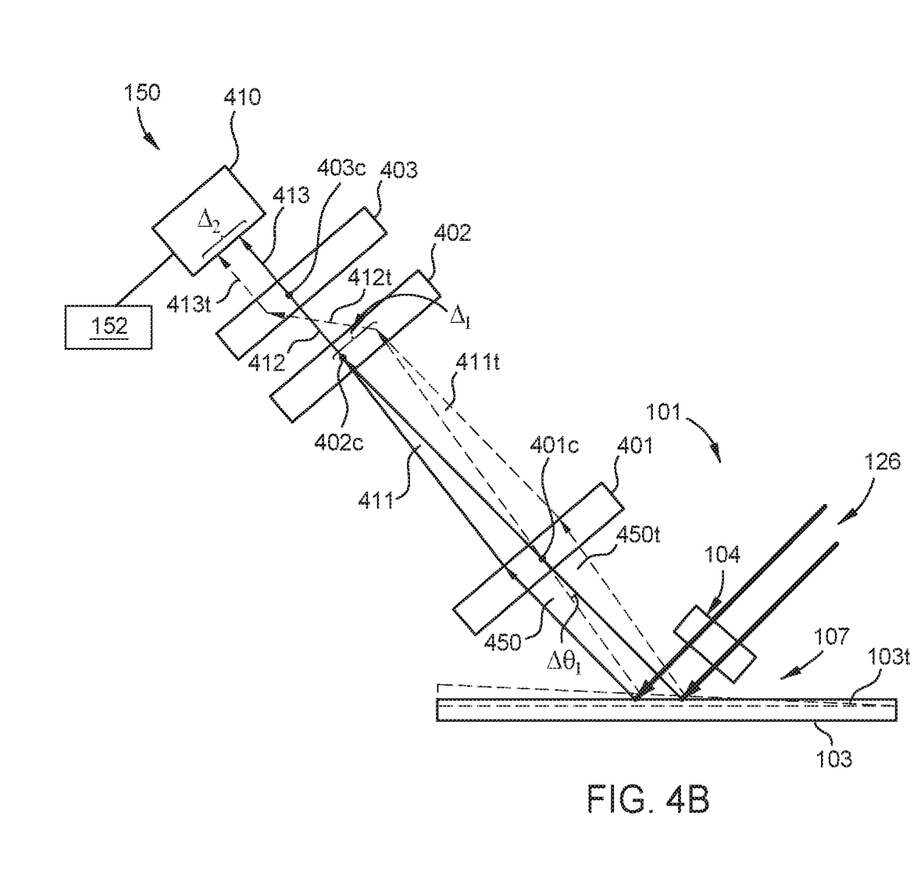

FIG. 4B illustrates a schematic view of the detector arm 150, according to one embodiment. As shown, the detector arm 150 further includes a second focusing lens 402 and a third focusing lens 403. The initial $R_0$ beam 450t is incident at an angle of $\Delta\theta_1$ on the first focusing lens 401, and the first focusing lens focuses the initial $R_0$ beam into a first $R_0$ beam 411t. The first $R_0$ beam 411t is incident on the second focusing lens 402, and the first focusing lens focuses the first $R_0$ beam into a second $R_0$ beam 412t. The second $R_0$ beam 412 is incident at a second incident spot on the third focusing lens 403, and the third focusing lens focuses the second $R_0$ beam into a third $R_0$ beam 413t to a portion of the detector 410 that is about the second delta distance $\Delta_2$ away from the focused third $R_0$ beam of the known substrate, where $\Delta_2=\Delta_1*f_3/f_2$, $f_2$ is the focal length of the second focusing lens, and $f_3$ is the focal length of the third focusing lens, according to one embodiment. In addition, $\Delta_2=f_3*f_1*\tan(\Delta\theta_1)/f_2$. Thus, the second delta distance $\Delta_2$ can be used to obtain local distortion information through the first angle $\Delta\theta_1$, as is described in further detail below. In some embodiments, the second delta distance $\Delta_2$ is greater than the first delta distance $\Delta_1$, which allows for a detector 410 with a lower resolution to be used, as the detector is only limited by the size of the second delta distance $\Delta_2$. The resolution of the detector 410 is less than about $\Delta_2$, according to one embodiment.

Although three focusing lenses 401, 402, 403 are included in the detector arm 150 as described above, it is contemplated that any number of focusing lenses could be used, and the lenses can be configured similarly as described above, in order to create even larger delta distances to be measured by the detector 410.

Figure 4C:
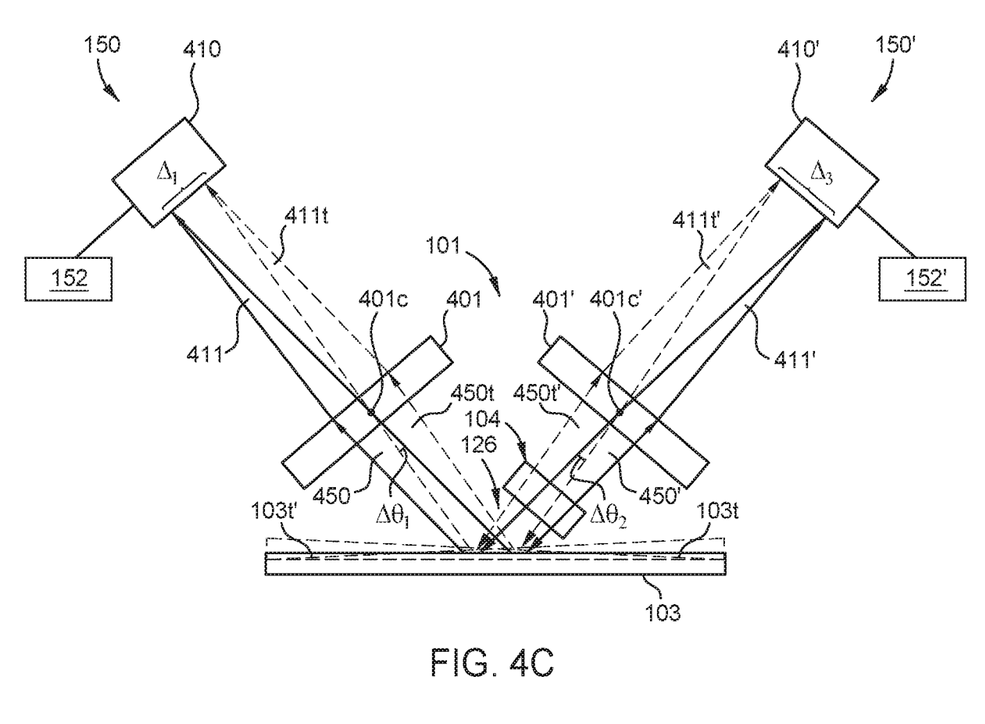

FIG. 4C illustrates a schematic view of the measurement system 101 with a primary detector arm 150 and a secondary detector arm 150', according to one embodiment. The primary detector arm 150 is substantially similar to the detector arm described above in FIG. 4A. As shown, the secondary detector arm 150' includes a first focusing lens 401', a detector 410', and a detector actuator 152'. In this embodiment, the light following the light path 126 back scatters to create a reflected $R_1$ beam 450t'. The secondary detector arm 150t' is located behind the optical arm 104, and the optical arm is at least partially transparent to the reflected $R_1$ beam 450t', according to one embodiment.

The reflected $R_1$ beam 450t' is incident on a third focusing spot on the first focusing lens 401' a third delta distance $\Delta_3$ from the optical center 401c' of the first focusing lens, and the first focusing lens focuses the reflected $R_1$ beam into a first $R_1$ beam 411$t'$, according to one embodiment. The third delta distance $\Delta_3$ is given by $\Delta_3 = f_1 * \tan(\Delta\theta_2)$, where $f_1$ is the focal length of the focusing lens 401'. Thus, the third delta distance $\Delta_3$ and the second angle $\Delta\theta_2$ can be used to obtain local distortion information, as is described in further detail below. The resolution of the detector 410' is less than about $\Delta_3$, according to one embodiment. A displacement angle $\Delta\theta$ is given by $\Delta\theta = \Delta\theta_2 - \Delta\theta_1$, and the displacement angle $\Delta\theta$ gives the local distortion of the pitch of the grating $P_{t-grating}$, as described in more detail below.

Figure 4D:
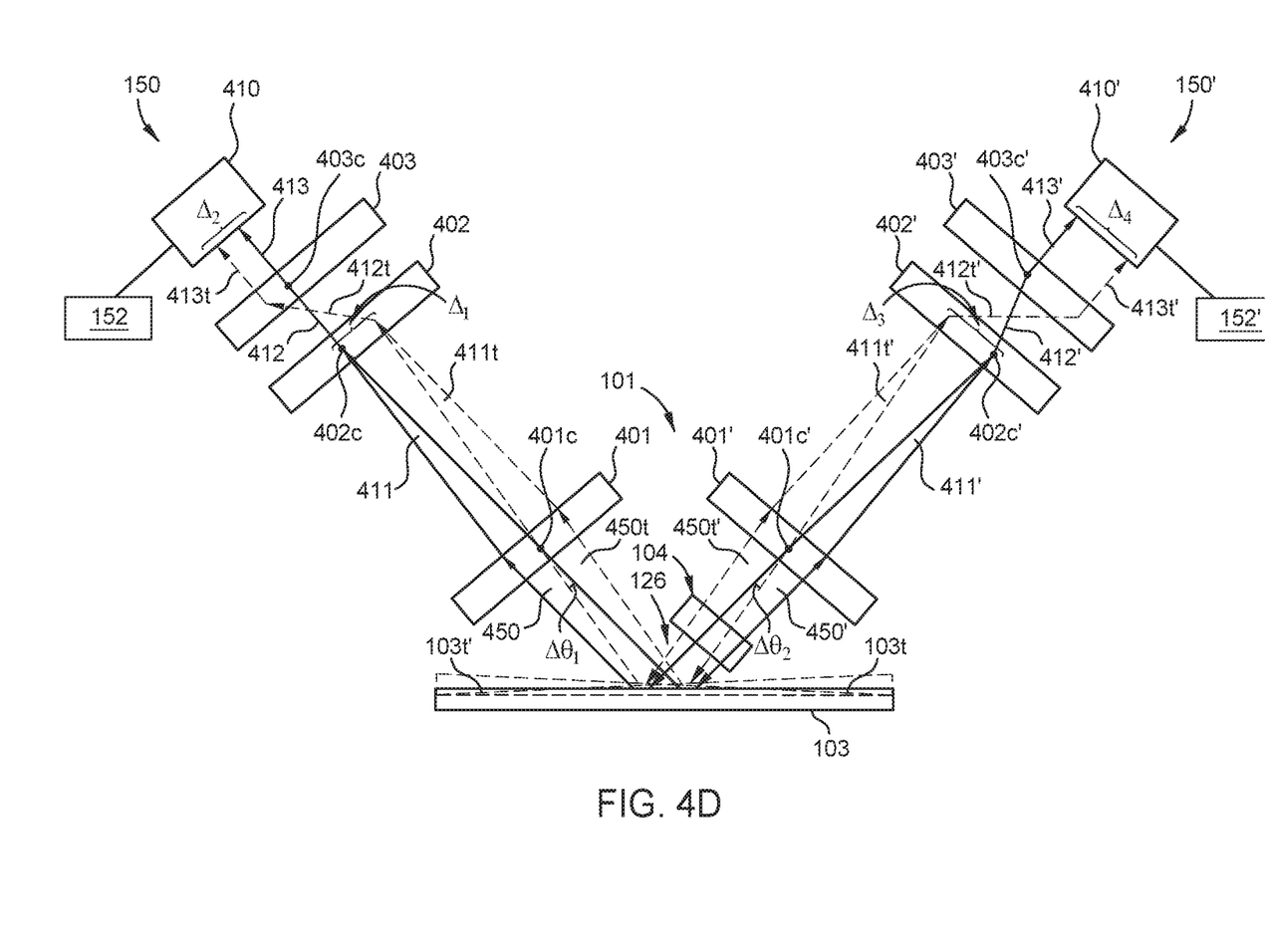

FIG. 4D illustrates a schematic view of the measurement system 101 with a primary detector arm 150 and a secondary detector arm 150', according to one embodiment. The primary detector arm 150 is substantially similar to the detector arm described above in FIG. 4B. As shown, the secondary detector arm 150' includes a first focusing lens 401', a second focusing lens 402', a third focusing lens 403', a detector 410', and a detector actuator 152'. In this embodiment, the light following the light path 126 back scatters to create a reflected $R_1$ beam 450$t'$. The secondary detector arm 150' is located behind the optical arm 104, and the optical arm is at least partially transparent to the reflected $R_1$ beam 450', according to one embodiment.

The reflected $R_1$ beam 450$t'$ is incident on a third focusing spot on the first focusing lens 401' a third delta distance $\Delta_3$ from the optical center 401$c'$ of the first focusing lens, and the first focusing lens focuses the reflected $R_1$ beam into a first $R_1$ beam 411$t'$, according to one embodiment. The first $R_1$ beam 411$t'$ is incident on the second focusing lens 402', and the first focusing lens focuses the first $R_1$ beam into a second $R_1$ beam 412$t'$. The second $R_1$ beam 412$t'$ is incident on a fourth focusing spot a fourth delta distance $\Delta_4$ from the optical center 403$c'$ of the third focusing lens 403', and the third focusing lens focuses the second $R_1$ beam into a third $R_1$ beam 413$t'$ to a portion of the detector 410' that is about the fourth delta distance $\Delta_4$ away from the focused third $R_1$ beam of the known substrate. Thus, the fourth delta distance $\Delta_4$ can be used to obtain local distortion information similarly to the second delta distance $\Delta_2$.

In some embodiments, the fourth delta distance $\Delta_4$ is greater than the third delta distance $\Delta_3$, which allows for a detector 410' with a lower resolution to be used, as the detector is only limited by the size of the fourth delta distance $\Delta_4$. The two delta distances $\Delta_2$, $\Delta_4$ allow for an even more detailed measurement of the local distortion of the region 107. The third delta distance $\Delta_3$ is greater than the first delta distance $\Delta_3$, according to one embodiment. The resolution of the detector 410' is less than about $\Delta_4$, according to one embodiment. The focal length of the first focusing lens 401 of the primary detector arm 150 is different than the focal length of the second focusing lens 402 of the primary detector arm, and the focal length of the second focusing lens of the primary detector arm is different than the focal length of the third focusing lens 403 of the primary detector arm, according to one embodiment.

Although FIGS. 4C-4D illustrate measurement systems 101 with two detector arms 150, 150' with the same number of focusing lenses, it is to be understood that any odd number of lenses can be used in each detector arm. For example, the primary detector arm 150 could have one focusing lens and the secondary detector arm 150' could have three focusing lenses, or vice versa. In other examples, the primary detector arm 150 has five focusing lenses and the secondary detector arm 150' has three focusing lenses.

In all the above and below embodiments, $\Delta_1$, $\Delta_2$, $\Delta_3$, and $\Delta_4$ range from about 10 um to about 1 mm, and $\Delta\theta_1$, $\Delta\theta_2$, $\Delta\theta_3$, and $\Delta\theta_4$ range from about 0.001° to about 1°, such as from about 0.001° to about 0.1°.

Figure 5:
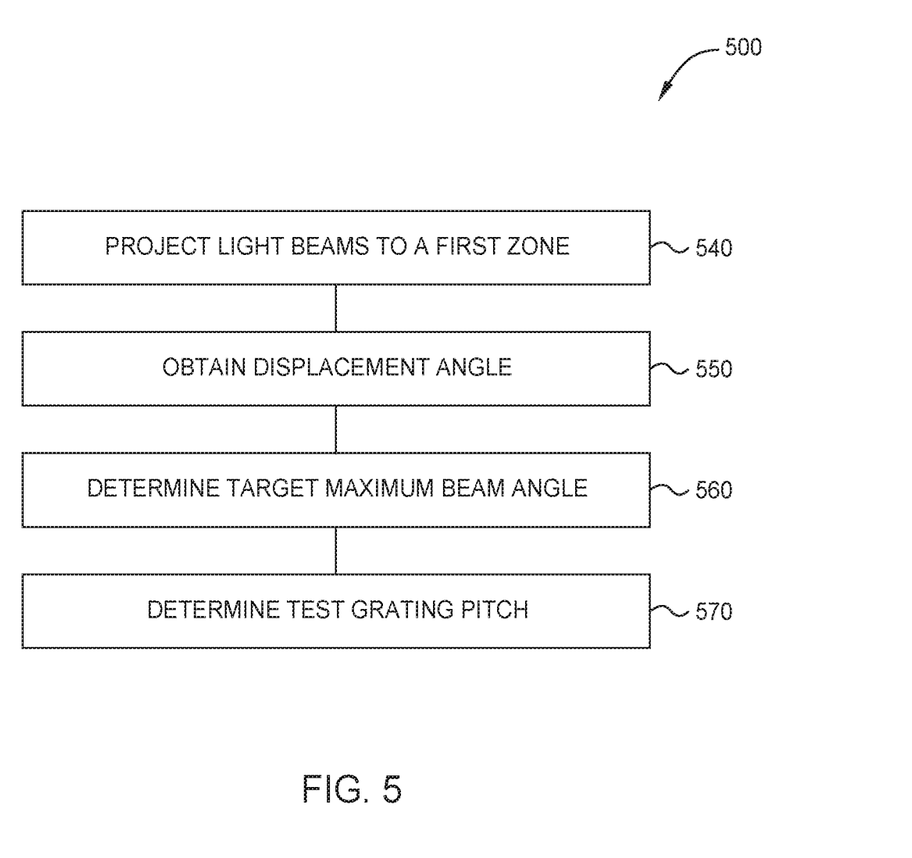
FIG. 5 is a flow chart of method operations for diffracting light, according to one embodiment.

FIG. 5 is a flow chart of method 500 operations for diffracting light, according to one embodiment. Although the method operations are described in conjunction with FIG. 5, persons skilled in the art will understand that any system configured to perform the method operations, in any order, falls within the scope of the embodiments described herein.

The method 500 begins at operation 540, where light beams having a wavelength $\lambda$ are projected to a first region 107 of a first substrate 103 at a fixed beam angle $\theta_0$ and a maximum orientation angle $\phi_{max}$. The method 500 can utilize any of the configurations 100A, 100B, 100C and any of the detector arm 150 configurations in FIGS. 1A-C and 4A-D of the measurement system 101. The white light source 114 projects white light at a fixed beam angle $\theta_0$ along the light path 126A to the reference region 107, with the reference region 107 having one or more gratings 109, $\theta_0 = \arcsin(\Delta_{laser}/2P_{grating})$, and $P_{grating}$ is the designed/average pitch of the gratings.

At operation 550, a displacement angle $\Delta\theta$ is obtained. The displacement angle $\Delta\theta$ is equal to the first angle $\Delta\theta_1$, where $\Delta\theta_1$ is given by $\Delta_1 = f_1 * \tan(\Delta\theta_1)$, and the displacement distance $\Delta_1$ as measured as described above, according to some embodiments. In some embodiments, the displacement angle $\Delta\theta$ is given by $\Delta\theta = \Delta\theta_2 - \Delta\theta_1$, where the second angle $\Delta\theta_2$ is given by $\Delta_2 = f_1 * f_3 * \tan(\Delta\theta_2)/f_2$, as described above.

At operation 560, the stage 102 is rotated until an initial intensity maximum (initial $I_{max}$) at the fixed beam angle $\theta_0$ is measured to obtain an maximum orientation angle $\phi_{max}$. The maximum orientation angle $\phi_{max}$ corresponds to the orientation angle $\phi$ of the one or more gratings 109 at the reference region 107. A target maximum beam angle $\theta_{t-max}$ is calculated, wherein $\theta_{t-max} = \theta_0 + \Delta\theta$. The calculation of the target maximum beam angle $\theta_{t-max}$ using $\Delta\theta$ accounts for the global distortion of the substrate, such as through tilting or warping.

At operation 570, the test grating pitch $P_{t-grating}$ is determined at the maximum orientation angle $\phi_{max}$. Determining the initial pitch includes projecting the white light at the fixed beam angle $\theta_0$ and the maximum orientation angle $\phi_{max}$ and solving the equation $P_{t-grating} = P_{grating} + \Delta P = \lambda_{laser} / (\sin\theta_{t-max} + \sin\theta_0)$. In addition, the change in the measured pitch $\Delta P$ is given by $$\Delta P = \frac{\lambda}{\sin\theta_{t-max} + \sin\theta_0} - \frac{\lambda}{2\sin\theta_0}$$

The change in the measured pitch $\Delta P$ can be from about 1 pm to about 5 nm.

In one embodiment, operations 540, 550, 560, and 570 are repeated. At operation 570, the stage 102 is scanned along the scanning path 110 and operations 540, 550, and 560 are repeated for subsequent zones of the one or more regions 107 of the one or more optical devices 105, or operations 540, 550, and 560 are repeated for subsequent regions. In addition, the operations 540, 550, 560, and 570 are repeated after the rotation of the entire substrate 103 about 180° about the z-axis, which allows for a global measurement of the wafer wedge.

As described above, an apparatus and a method are included that is configured to measure local nonuniformity of optical devices. Reflected laser light is detected by a detector arm. The detector arm includes one or more focusing lenses, and the one or more focusing lenses focus the light onto a detector, such as a camera. The displacement of the reflected light compared to a test substrate is used to calculate the local nonuniformity present. The substrate can be scanned such that nonuniformity of different regions of the substrate can be measured.

The measurement system and method allow for measurement of nonuniform properties of optical devices on the substrate, such as grating pitches and grating orientations. In addition, the measurement system and method can determine local warping or deformations in the underlying substrate. Also, defects of the underlying support surface, such as imperfections of particles, can be located in order to determine whether the substrate and optical devices have acceptable characteristics. The measurements can be performed on substrates or optical devices of varying size and shape.

While the foregoing is directed to embodiments of the present disclosure, other and further embodiments of the disclosure may be devised without departing from the basic scope thereof, and the scope thereof is determined by the claims that follow.

What is claimed is:

1. A measurement system, comprising:
   a stage having a substrate support surface, the stage coupled to a stage actuator configured to move the stage in a scanning path and rotate the stage about an axis;
   an optical arm coupled to an arm actuator configured to scan the optical arm and rotate the optical arm about the axis, the optical arm having:
      a laser positioned adjacent to a beam splitter positioned in a light path adjacent to an optical detector, the laser operable to project light beams to the beam splitter that are deflected at a beam angle θ along the light path to the stage; and
   a detector arm, comprising:
      a detector actuator configured to scan the detector arm and rotate the detector arm about the axis;
      a first focusing lens; and
      a detector.

2. The measurement system of claim 1, wherein the optical arm further comprises:
   a white light source operable to project white light at the beam angle θ along the light path to the stage; and
   a spectrometer coupled to the optical detector to determine wavelengths of the light beams deflected to the optical detector.

3. The measurement system of claim 1, wherein the optical arm further comprises:
   a polarizer positioned between the laser and the beam splitter; and
   a quarter waveplate positioned adjacent to the beam splitter in the light path.

4. The measurement system of claim 1, wherein the light beams are reflected to an initial $R_0$ beam, the initial $R_0$ beam incident on the first focusing lens at a first incident spot, wherein the first incident spot is separated from the optical center of the first focusing lens by a first delta distance $\Delta_1$.

5. The measurement system of claim 4, wherein the resolution of the detector is less than about $\Delta_1$.

6. The measurement system of claim 4, further comprising a second focusing lens and a third focusing lens.

7. The measurement system of claim 6, wherein the initial $R_0$ beam is focused into a first $R_0$ beam by the first focusing lens, the first $R_0$ beam is focused into a second $R_0$ beam by the second focusing lens, and the second $R_0$ beam is focused into a third $R_0$ beam by the third focusing lens.

8. The measurement system of claim 7, wherein:
   the third $R_0$ beam is incident on the third focusing lens at a third incident spot,
   the third incident spot is separated from the optical center of the third focusing lens by a second delta distance $\Delta_2$, and
   the second delta distance $\Delta_2$ is greater than the first delta distance $\Delta_1$.

9. A measurement system, comprising:
   a stage having a substrate support surface, the stage coupled to a stage actuator configured to move the stage in a scanning path and rotate the stage about an axis;
   an optical arm coupled to an arm actuator configured to scan the optical arm and rotate the optical arm about the axis, the optical arm comprising:
      a laser positioned adjacent to a beam splitter positioned in a light path adjacent to an optical detector, the laser operable to project light beams to the beam splitter that are deflected at a beam angle θ along the light path to the stage; and
   a primary detector arm and a secondary detector arm, each comprising:
      a detector actuator configured to scan the primary detector arm or the secondary detector arm;
      a first focusing lens; and
      a detector.

10. The measurement system of claim 9, wherein the secondary detector arm is disposed behind the optical arm.

11. The measurement system of claim 10, wherein:
    the light beams are reflected to an initial $R_0$ beam, the initial $R_0$ beam incident on the first focusing lens of the primary detector arm at a first incident spot of the primary detector arm,
    the first incident spot of the primary detector arm is separated from the optical center of the first focusing lens of the primary detector arm by a first delta distance $\Delta_1$,
    the light beams are reflected from a workpiece disposed on the stage to a reflected $R_1$ beam, the reflected $R_1$ beam incident on the first focusing lens of the secondary detector arm at a first incident spot of the secondary detector arm, and
    the first incident spot of the secondary detector arm is separated from the optical center of the first focusing lens of the secondary detector arm by a third delta distance $\Delta_3$.

12. The measurement system of claim 11, wherein the first delta distance $\Delta_1$ is less than about 1 mm.

13. The measurement system of claim 12, wherein the first delta distance $\Delta_1$ is less than about 1 mm.

14. The measurement system of claim 9, where the focal length of the first focusing lens of the primary detector arm is different than the focal length of the first focusing lens of the secondary detector arm.

15. A method of diffracting light, comprising:
    projecting light beams having wavelength $\Delta_{laser}$ to a first zone of a first substrate at a fixed beam angle $\theta_0$ and a maximum orientation angle $\phi_{max}$;
    obtaining a displacement angle $\Delta\theta$;
    determining a target maximum beam angle $\theta_{t-max}$, wherein $\theta_{t-max} = \theta_0 + \Delta\theta$; and
    determining a test grating pitch $P_{t-grating}$ by a modified grating pitch equation $P_{t-grating} = \lambda_{laser}/(\sin \theta_{t-max} + \sin \theta_0)$.

16. The method of claim 15, wherein the projecting light beams, the obtaining a displacement angle $\Delta\theta$, the determining a target maximum beam angle $\theta_{t\text{-}max}$, and the determining a test grating pitch $P_{t\text{-}grating}$ are repeated for subsequent zones.

17. The method of claim 15, wherein the obtaining a displacement angle $\Delta\theta$ comprises:

reflecting the light beams off the first zone into an initial $R_0$ beam, such that the initial $R_0$ beam incident on a focusing lens at a first incident spot, the first incident spot is separated from the optical center of the focusing lens by a first delta distance $\Delta_1$; and determining a first angle $\Delta\theta_1$ from the first delta distance $\Delta_1$.

18. The method of claim 17, wherein the determining a first angle $\Delta\theta_1$ comprises using the equation $\Delta_1 = f_1 * \tan(\Delta\theta_1)$, where $f_1$ is the focal length of the focusing lens.

19. The method of claim 18, wherein the obtaining a displacement angle $\Delta\theta$ further comprises:

focusing the incident $R_0$ beam into a first $R_0$ beam by the focusing lens;

focusing the first $R_0$ beam into a second $R_0$ beam by a second focusing lens;

focusing the second $R_0$ beam into a third $R_0$ beam by a third focusing lens, such that the third $R_0$ beam is incident on the third focusing lens at a third incident spot, such that the third incident spot is separated from the optical center of the third focusing lens by a second delta distance $\Delta_2$; and determining the first angle $\Delta\theta_1$ from the second delta distance $\Delta_2$ using the equation $\Delta_2 = f_1 * \tan(\Delta\theta_1) * f_3/f_2$, wherein $f_2$ is the focal length of the second focusing lens, and $f_3$ is the focal length of the third focusing lens.

20. The method of claim 15, wherein the first angle $\Delta\theta$ ranges from about 0.001° to about 0.1°.

\* \* \* \* \*

UNITED STATES PATENT AND TRADEMARK OFFICE
CERTIFICATE OF CORRECTION

PATENT NO. : 10,801,890 B1
APPLICATION NO. : 16/539930
DATED : October 13, 2020
INVENTOR(S) : Jinxin Fu et al.

It is certified that error appears in the above-identified patent and that said Letters Patent is hereby corrected as shown below:

In the Specification

In Column 7, Line 2, delete "$\Delta_3=f_1,*\tan(\Delta\theta_2)$, where $f_1$" and insert -- $\Delta_3=f_{1'}*\tan(\Delta\theta_2)$, where $f_{1'}$ --, therefor.

In the Claims

In Column 10, Line 59, in Claim 15, delete "$\Delta_{laser}$" and insert -- $\lambda_{laser}$ --, therefor.

Signed and Sealed this
Twenty-fourth Day of November, 2020

Andrei Iancu
*Director of the United States Patent and Trademark Office*